United States Patent [19]
Speckhahn

[11] Patent Number: 5,615,590
[45] Date of Patent: Apr. 1, 1997

[54] GUIDE COLLET ADAPTOR FOR RADIAL JAW CHUCK LATHES

[76] Inventor: Henry D. Speckhahn, 6864 Phillips Parkway Dr. South, Jacksonville, Fla. 32256

[21] Appl. No.: 498,172

[22] Filed: Jul. 5, 1995

[51] Int. Cl.⁶ .................................................. B23B 13/02
[52] U.S. Cl. ................................................ 82/162; 279/143
[58] Field of Search ..................... 82/162; 279/143–145

[56] References Cited

U.S. PATENT DOCUMENTS

| | | | |
|---|---|---|---|
| 4,258,598 | 3/1981 | Hoffmann | 82/162 |
| 5,431,416 | 7/1995 | Thornton | 279/143 |

FOREIGN PATENT DOCUMENTS

| | | | |
|---|---|---|---|
| 4164501 | 6/1992 | Japan | 82/162 |
| 76361 | 11/1954 | Netherlands | 82/162 |

*Primary Examiner*—M. Rachuba
*Assistant Examiner*—Kenneth J. Hansen
*Attorney, Agent, or Firm*—Thomas C. Saitta

[57] ABSTRACT

An adaptor for automatic CNC turning lathes equipped with radial jaw chucks and opposing sub-spindles capable of gripping and moving a workpiece longitudinally during the cutting operation, the adaptor comprising a guide collet mounted coaxially on the longitudinal axis of the feed bore of the lathe, the adaptor being mounted so as not to interfere with the radial movement of the radial jaw chucks, where the guide collet allows for longitudinal movement of the workpiece during the machining operation but prevents the workpiece from deviating out of axial alignment during rotation, such that the cutting operation is performed adjacent the guide collet to prevent deflection of the workpiece by the cutting bit.

14 Claims, 2 Drawing Sheets

5,615,590

GUIDE COLLET ADAPTOR FOR RADIAL JAW CHUCK LATHES

BACKGROUND OF THE INVENTION

This invention relates generally to the field of automatic CNC (Computerized Numerical Control) turning lathes, and more particularly to the field of chucks and collet guides used to retain or position workpieces during the cutting operations. Even more particularly, the invention relates to an adaptor device which allows an automatic CNC turning lathe with a sub-spindle to be converted to a lathe capable of performing Swiss-type machining.

There are two basic types of automatic CNC turning lathes used to shape parts from elongated cylindrical or tubular stock. The first utilizes a stationary headstock and a chuck which grips and rotates the workpiece stock while the cutting bits are moved radially and longitudinally along the length of the workpiece, the workpiece itself remaining stationary in the longitudinal direction. The second, known as the Swiss-type sliding headstock automatic lathe, utilizes a non-stationary headstock and a chuck which grips, rotates and feeds the workpiece stock longitudinally while the cutting bit remains stationary in the longitudinal direction and moves only in the radial direction to machine the workpiece. The Swiss-type sliding headstock lathe utilizes a stationary guide bushing in front of and aligned with the sliding headstock chuck to guide and support the workpiece stock. Different machining operations dictate which type of automatic CNC lathe is preferred for producing a particular part. The Swiss-type sliding headstock lathe is preferred for production of long, small diameter parts such as needles, since all cutting occurs near the guide bushing end where the workpiece is supported against the deflective forces of the cutting bit by the guide bushing and the opposite end of the workpiece is supported by the sub-spindle.

It is an object of this invention to provide an adaptor device which can be mounted onto an automatic CNC turning lathe with a sub-spindle which allows the lathe to perform Swiss-type turning. It is a further object to provide such a device which does not require extensive alteration of the chuck of the automatic CNC lathe, and which allows the radial jaws of the automatic CNC lathe to operate unhindered.

SUMMARY OF THE INVENTION

The invention is an adaptor for use in combination with automatic CNC (Computerized Numerical Control) turning lathes set up with an opposing sub-spindle and using hydraulically operated, radial jaw chucks for holding a workpiece to be machined, where the workpiece stock is fed through the feed bore of the radial jaw chuck and fixed in position, then rotated on its longitudinal axis with no longitudinal movement of the workpiece, the machining of the workpiece being accomplished by movement of a cutting bit in the longitudinal Z-direction and the radial X-direction. The adaptor allows this automatic CNC turning lathe to be easily converted to a reversed machining process, known as Swiss-type turning, in which the workpiece stock is fed through a bushing-type guide collet and the free end of the workpiece is gripped by the rotating sub-spindle. The workpiece is then pulled by the sub-spindle in the longitudinal Z-direction during the machining operation, with the cutting bit remaining stationary in the longitudinal Z-direction and moving only in the radial X-direction to machine parts to the desired shape.

The guide collet adaptor is generally comprised of a mounting plate which is adapted to be secured to the face of the radial jaw chuck by mechanical fasteners or the like, the mounting plate having jaw recesses which allow movement of the radial jaws in the conventional manner, a generally cylindrical collet housing affixed to the mounting plate, and a cylindrical guide collet or bushing, the collet housing receiving and retaining the guide collet or bushing. The guide collet is a split tubular sleeve aligned along the central axis of the workpiece feed bore of the radial jaw chuck, whereby workpiece stock fed through the bore of the radial jaw chuck passes through the central bore of the guide collet as well. The guide collet is chosen to correspond to the outer diameter of the workpiece to allow rotation and longitudinal movement of the workpiece within the stationary guide collet, such that the inner diameter of the guide collet is only slightly greater than the outer diameter of the workpiece. Preferably, the inner diameter of the guide collet is adjustable to some degree to allow precise mating with the workpiece should variation in the size of the outer diameter occur.

The turning operation with the guide collet adaptor in place is performed by first inserting the workpiece stock through the feed bore and the guide collet to expose a short segment of the workpiece. The radial jaws are then tightened around the workpiece in the conventional manner, the workpiece is rotated on the longitudinal axis and the free end of the workpiece is machined if desired. The sub-spindle is extended to grip the free end of the workpiece, at which time the radial jaws are retracted. Rotation of the workpiece is now controlled by the sub-spindle. The workpiece is pulled through the guide collet and machined as desired in the longitudinal direction, the guide collet retaining the workpiece in proper axial alignment. Since the cutting operation occurs adjacent the end of the guide collet, very long parts of small cross-sectional diameter can be machined, such as needles for example, since the guide collet prevents deformation and deflection of the workpiece from the pressure of the cutting bit. Such parts cannot be machined in conventional CNC turning lathes with longitudinal movement of the cutting bit, since the workpiece will deflect from the pressure of the cutting operation in the non-supported interior regions.

The guide collet adaptor device is designed to be utilized with standard radial jaws found on existing CNC lathes, but in the preferred embodiment the standard jaws are replaced with jaws which are thinner in the axial Z-direction, thus allowing the jaw recesses to be shallower and the guide collet adaptor to be shorter overall in the axial direction, thereby increasing the available space for cutting along the axial Z-direction between the sub-spindle and the end of the guide collet and allowing the machining of longer parts.

DETAILED DESCRIPTION OF THE INVENTION

With reference now to the drawings, the invention will be described in detail with regard for the best mode and preferred embodiment. The invention is a collet guide adaptor device which allows a conventional CNC turning lathe, equipped with a sub-spindle, having a feed-through radial jaw chuck in which the tubular or cylindrical workpiece is gripped by radial jaws and rotated during the machining operation and in which the cutting bit itself is moved along the workpiece in the longitudinal Z-direction, to be converted easily and quickly into a lathe capable of Swiss-type turning where the rotating workpiece is gripped by the sub-spindle and pulled past the stationary (in the longitudinal Z-direction) cutting bit during the machining operation.

Figure 1:
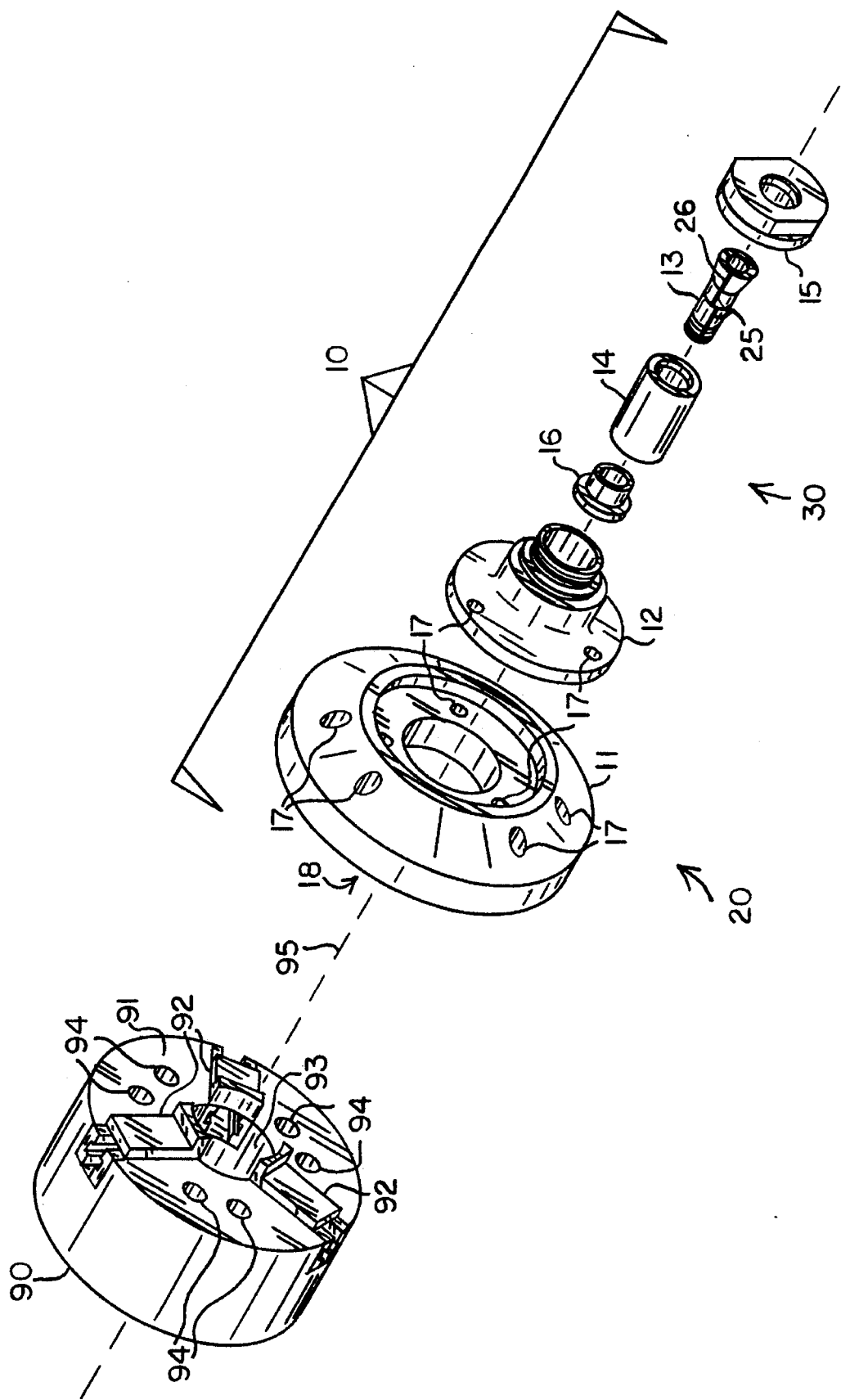
FIG. 1 is an exploded perspective view of the component elements of the invention shown in aligned relation with the radial jaw chuck.
Figure 3:
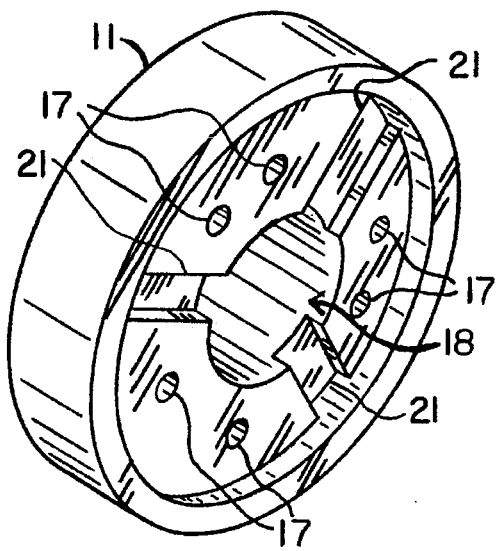
FIG. 3 is a rear perspective view of the mounting plate of the invention showing the jaw recesses and central bore.

Referring now to FIG. 1, the main components of the invention are illustrated. The guide collet adaptor device 10 comprises in general mounting means 20, such as a mounting plate 11 adapted to be affixed by mechanical fasteners, to connect the device 10 to the face 91 of a conventional radial jaw chuck 90, a guide collet or bushing 13, and collet retention means 30. Collet retention means 30 is adapted to receive the guide collet 13 and maintain it in co-axial alignment with the feed bore 93 of the radial jaw chuck 90, and as shown comprises a collet housing 12 which generally retains the guide collet 13 within a master collet holder 14, a collet retainer nut 15 and a collet tensioner nut 16. Mounting means 20 may comprise any suitable means to fixedly attach the device 10 to the radial jaw chuck 90, such as the through the provision of threaded apertures 94 which receive mechanical fastener bolts inserted through mounting apertures 17 in mounting plate 11. In this manner the device 10 can be readily installed on the conventional radial jaw chuck 90 and likewise easily removed. The collet guide adaptor device 10 when assembled has a central bore 18 which extends through the device such that workpiece feedstock 99 can be passed through the device 10. The components of the device 10 are aligned symmetrically about the longitudinal axis 95 of the feed bore 93 when the mounting plate 11 is affixed to the radial jaw chuck 90. The rear of the mounting plate 11 contains a number of jaw recesses 21 which correspond in size, configuration and number to the jaws 92 of the radial jaw chuck 90 to which the adaptor device 10 is to be mounted. As shown in FIG. 3, the jaw recesses 11, typically three in number, extend radially from the central bore 18 and create a path for unobstructed radial movement of the jaws 92. The jaw recesses 21 allow the workpiece 99 to be gripped by the radial jaw chuck 90 when the adaptor device 10 is in place.

Figure 2:
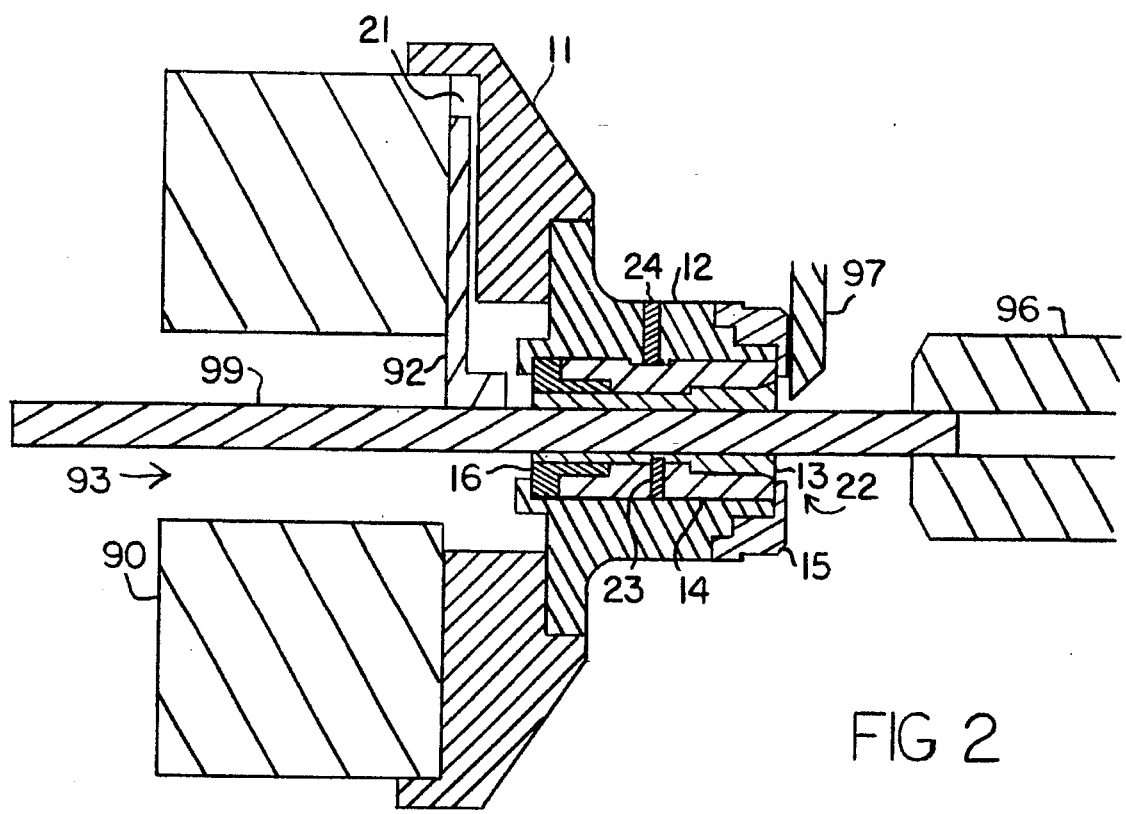
FIG. 2 is a cross-sectional view of the invention as mounted onto a conventional radial jaw chuck, showing the workpiece and sub-spindle.

As seen in FIG. 2, the collet retention means 30 positions the guide collet 13 in axial alignment with the longitudinal axis 95 of the feed bore 93 of the radial jaw chuck 90, such that the workpiece 99 can be fed through the feed bore 93 directly into the central bore 18 of the adaptor device 10 and out through the open end 22 of guide collet 13. The guide collet 13 is a tubular cylinder preferably having a slotted end and an inner diameter sized to be slightly greater than the outer diameter of the particular workpiece 99 being machined. The guide collet 13 allows axial rotation of the workpiece 99 while insuring that the rotation does not deviate from the longitudinal axis 95. In the preferred embodiment, the guide collet 13 is held within a generally tubular master collet holder 14 positioned within a collet housing 12, the collet housing 12 being joined to the mounting plate 11 by any suitable means, including for example mechanical fasteners positioned in mounting apertures 17. The guide collet 13 and the master collet holder 14 are both non-rotatably affixed within the collet housing 12, such as through the provision of an alignment pin 23 mounted into the master collet holder 14 to be received in a longitudinal slot 25 on the exterior of the guide collet and provision of a set screw 24 extending through the collet housing 12 to abut the exterior of the master collet holder 14. A collet retainer nut 15 is threaded onto the end of the collet housing 12 to secure guide collet 13 in the axial direction.

Preferably, the inner diameter of guide collet 13 is adjustable within a small range through the provision of a number of slits 26 in its conical end to allow the collet guide 13 to be sized to correspond to small deviation in the outer diameter of the workpiece stock 99. This is accomplished as shown by providing a threaded collet tensioner nut 16, mounted co-axially within the collet housing 12 at the enclosed end of guide collet 13, which automatically increases or decreases the actual inner diameter of the guide collet 13 in response to changes in the outer diameter of the workpiece stock 99. The guide collet 13 is provided with external threads to mate with internal threads on the tensioner nut 16. The tensioner nut 16 is split such that any increase in the workpiece 99 diameter will spread apart slightly the threads of the tensioner nut 16, allowing the collet guide 13 to move axially with respect to the master collet holder 14. As the end of the collet guide 13 moves outwardly from the master collet holder 14, the slits 26 allow it to expand to accommodate the increased diameter of the workpiece 99. Alternatively, if the outer diameter of the workpiece stock 99 should decrease slightly, the tensioner nut 16 presses against the collet guide 13 and the threads cause the collet guide 13 to be retracted into the master collet holder 14. The slits 26 in the conical end of the conical guide 13 allow its internal diameter to be decreased by action of the conical seat in the master collet holder 14, decreasing the internal diameter of the collet guide 13 to again match the outer diameter of the workpiece 99. For large changes in workpiece 99 diameter, the guide collet 13 is replaced with one of proper dimensions by removing the collet retainer nut 15, removing the guide collet 13, inserting the properly sized guide collet 13 and replacing the collet retainer nut 15.

To convert a conventional CNC lathe to do reverse machining of the Swiss-type turning, the correctly sized collet guide 13 is installed into the adaptor 10, and the adaptor 10 itself is mounted onto the radial jaw chuck 90. The radial jaws 92 are retracted and the workpiece 99 is fed through the feed bore 93 such that the free end of the workpiece 99 extends a short distance out from the collet guide 13. The radial jaws 92 are then tightened to grip and rotate the workpiece 99 to machining speed. If needed the free end of the workpiece 99 can be machined in the standard manner using longitudinal movement of the cutting bit 97 in the Z-direction, or the free end of the workpiece 99 can be left as supplied. The sub-spindle 96 is then rotated to synchronize with the speed of the rotating workpiece 99, the sub-spindle 96 is extended and its chuck grips the workpiece 99. The radial jaws 92 of the radial jaw chuck 90 are retracted to release the workpiece 99, such that rotation of the workpiece 99 is controlled by the sub-spindle 96. The cutting bit 97 is then positioned adjacent or near to the end of the collet guide 13 and moved in the radial X-direction to machine the workpiece 99 to the desired contours. The cutting bit 97 remains stationary in the longitudinal Z-direction while the sub-spindle 96 is retracted to move the workpiece 99 longitudinally during the machining operation. Since all machining occurs near the point where the workpiece 99 is held in position by the end of the collet guide 13, very long, small diameter parts can be successfully machined, since the deflective force of the cutting bit 97 is countered by the collet guide 13.

It is contemplated that those skilled in the art may be aware of obvious substitutions or equivalents to the components as set forth above, and the true scope and definition of the invention therefore, is to be as set forth in the following claims.

I claim:

1. A collet guide adaptor device for guiding a cylindrical or tubular workpiece during a machining operation in combination with an automatic CNC turning lathe equipped with an opposing sub-spindle and having a face containing radial jaw chucks for holding the cylindrical or tubular workpiece within a central bore, the device comprising:

(A) mounting means to affix said device to the face of the lathe whereby said adaptor does not interfere with radial movement of said radial jaw chucks;

(B) collet retention means to retain a non-rotating guide collet in co-axial alignment with the central bore of said lathe; and (C) a non-rotating guide collet which prevents the workpiece from deviating from the longitudinal axis during rotation while allowing longitudinal movement of said workpiece during the machining operation.

2. The device of claim 1, where said mounting means comprises a plate having radial recesses corresponding to said radial jaw chucks and is adapted for connection to the face of said lathe by mechanical means.

3. The device of claim 1, where said collet retention means comprises a master collet holder to co-axially retain said guide collet.

4. The device of claim 3, where said collet retention means further comprises a collet housing for retaining said master collet holder, where said collet housing is connected to said mounting means.

5. The device of claim 4, where said collet retention means further comprises a collet retainer nut to retain said master collet holder within said collet housing.

6. The device of claim 1, where said guide collet comprises a longitudinal slot which allows the internal diameter of said guide collet to increase or decrease.

7. The device of claim 6, further comprising a collet tensioner nut connected to said guide collet, said collet tensioner nut automatically adjusting said internal diameter of said guide collet in response to changes in diameter of said workpiece.

8. A collet guide adaptor device for guiding a cylindrical or tubular workpiece during a machining operation in combination with an automatic CNC turning lathe equipped with an opposing sub-spindle for gripping and longitudinally moving the cylindrical or tubular workpiece, the lathe having a central bore with a longitudinal axis for receiving the workpiece, a face with radial jaw chucks which move in the radial direction to grip and release the workpiece, and a cutting bit capable of movement in the longitudinal direction and the radial direction for shaping the workpiece, the device comprising:

(A) a generally tubular non-rotating guide collet having an inner diameter corresponding to the outer diameter of said workpiece, said guide collet being positioned co-axially on said longitudinal axis to prevent said workpiece from deviating out of alignment with said longitudinal axis during rotation of said workpiece while allowing for longitudinal movement of said workpiece during the machining operation;

(B) collet retention means to maintain said guide collet in co-axial alignment relative to said central bore and longitudinal axis of said lathe; and (C) mounting means to attach said collet guide to said face of said lathe, said mounting means allowing radial movement of said radial jaw chucks.

9. The device of claim 8, where said mounting means comprises a plate having radial recesses corresponding to said radial jaw chucks and is adapted for connection to the face of said lathe by mechanical means.

10. The device of claim 8, where said collet retention means comprises a master collet holder to co-axially retain said guide collet.

11. The device of claim 10, where said collet retention means further comprises a collet housing for retaining said master collet holder, where said collet housing is connected to said mounting means.

12. The device of claim 11, where said collet retention means further comprises a collet retainer nut to retain said master collet holder within said collet housing.

13. The device of claim 8, where said guide collet comprises a longitudinal slot which allows the internal diameter of said guide collet to increase or decrease.

14. The device of claim 13, further comprising a collet tensioner nut connected to said guide collet, said collet tensioner nut automatically adjusting said internal diameter of said guide collet in response to changes in diameter of said workpiece.

* * * * *